H. H. HANCOCK.
LINING APPARATUS.
APPLICATION FILED JAN. 20, 1916.

1,276,060.

Patented Aug. 20, 1918.
4 SHEETS—SHEET 4.

Witness
E. A. Jarvis

Inventor
Harry H. Hancock
by Geo. Lew Hedlock
attorney.

UNITED STATES PATENT OFFICE.

HARRY H. HANCOCK, OF SWAMPSCOTT, MASSACHUSETTS, ASSIGNOR OF ONE-HALF TO ARTHUR S. WEBSTER, OF HALIFAX, MASSACHUSETTS.

LINING APPARATUS.

1,276,060.   Specification of Letters Patent.   Patented Aug. 20, 1918.

Application filed January 20, 1916. Serial No. 73,133.

*To all whom it may concern:*

Be it known that I, HARRY H. HANCOCK, a citizen of the United States, residing at Swampscott, county of Essex, State of Massachusetts, have invented certain new and useful Improvements in Lining Apparatus, of which the following is a specification.

This invention relates to lining apparatus adapted to enable the printer to register the printed matter at the back of a page with that at the front of the page, so that the printed lines and the headings will be in proper register. Under the present invention sheets having as many as forty-eight and sixty-four pages can be lined up to proper margins, either in type measurement or in inches before the printing form goes to press, and the forms then struck into the line-up, so as to eliminate all waiting time of the press. On the other hand, the sheet may be lined up after as well as before the form is on the press so as to show absolutely the moves which are necessary for a perfectly lined up sheet, thereby saving a large percentage of the waiting time of the press over the present method of lining up by hand. Other objects of the invention are to gain desirable advantages over the imposing stone line-up of the form, and to provide an apparatus which will show up any possible chance that the sheet is not gaged evenly on the gripper edge, or that it is not being drawn evenly around the cylinder during the impression period. Still other objects of the invention are to provide an apparatus which will line up any sheet, from the capacity of the machine to the smallest, and of any number of pages, through the medium of very simple adjustments, and furthermore to provide an apparatus of this class which is a great saver of time to the printer and is of very simple construction.

These being among the objects of the present invention, the same consists of certain features of construction and combinations of parts to be hereinafter described and then claimed with reference to the accompanying drawings illustrating a desirable embodiment of the invention, in which—

Fig. 11ª is a view similar to Fig. 11, except that the marker is shown in reversed position but in the same location as in Fig. 11;

The frame or table 20 of the apparatus preferably comprises pieces of angle metal arranged in rectangular form, supported upon legs or the like, said frame having a top opening 21. A sheet imposing plate 22 is supported rigidly within opening 21 as by means of transverse supports 23 on frame 20. The upper surface of said plate is preferably set substantially flush with the upper surface of the frame or table, and over said surface of said plate and through slots between the plate and the said frame or table there is arranged an apron sheet 24 of suitably flexible and soft material to provide a yielding surface on the imposing plate. The ends of said flexible apron sheet are preferably wound upon take-up rolls 25, 26, mounted in suitable bearings of the frame and provided with hand cranks 25ª, 26ª respectively, whereby the desired degree of tautness may be imparted to said apron sheet. Said tautness is maintained by pawl and ratchet devices 26ᵇ at the crank ends of said rolls, Figs. 1 and 2. This apron sheet furnishes a soft yielding surface for the proper action of the markers to be hereinafter described.

A guide-rail 27, preferably in the form of a tube, is supported along one edge of the frame or table, just beyond the corresponding edge of the sheet imposing plate, and a similar guide rail 28 is arranged along an adjacent edge of the frame or table just beyond the corresponding edge of the sheet imposing plate. As the sheet imposing plate is of rectangular form, the said guide-rails 27, 28, are arranged so as to form a right angle with each other, and to assure this position of the said guide-rails, they are supported by brackets 29, 30 and 31 screwed or otherwise fastened to three consecutive corners of the frame or table. Bracket 29 is provided with a socket 29ᵃ which supports one end of the guide-rail 27, while bracket 30 is provided with a socket 30ᵃ to receive the other end of said rail. Bracket 30 is also provided with a socket 30ᵇ located adjacent and at right angles to socket 30ᵃ, for receiving one end of the other guide-rail 28, the other end of which rail is supported in socket 31ᵃ of bracket 31. The said rails are suitably secured in their sockets so as to render them rigid.

Referring to Figs. 1, 2, 4, 5 and 6, a carriage 32 is provided at opposite ends with guide eyes 33, 34, through which the guide-rail 28 passes with a sufficiently snug fit to permit the said carriage to be guided along said rail without binding thereon but without lateral vibration. This will assure that the said carriage will be guided in a straight line which is parallel with the adjacent edge of the sheet imposing plate 22. Mounted on carriage 32 so as to extend at right angles to the guide-rail 28 is a rock-shaft or arm 36, which is journaled or swiveled in a bearing 37 transverse of carriage 32, and said rock-shaft or arm may be oscillated on its axis by means of a substantially U-shaped handle 38; see Figs. 7, 8 and 9. The ends of handle 38 are formed as ears 39, 40, which receive set screws 41 for rigidly mounting said handle on said rock-shaft. In order to confine the oscillation of the rock-shaft within given limits, both ends of the bearing 37 are cut out or recessed at 42, and the ends of the recesses respectively constitute abutments 43 and 44. For the purpose of coöperating with the abutments, the handle 38 is provided on each ear with a stop member 45, of segmental shape, the ends of which member respectively constitute stops 46, 47. From Fig. 4 it will be clear that by means of the handle 38, the rock-shaft may be rocked through an angle including the full line and the dotted line positions of said handle, such movement being limited on the one hand by the stops 46 abutting against the abutments 43, and on the other hand by stops 47 abutting against the abutments 44. This angular movement has relation to a corresponding angular movement of the markers to be hereinafter described. In order to provide a proper gripping surface for the hand of the operator on the handle, said handle is provided with depressions 48, 48ᵃ located at opposite sides thereof.

Markers, such as 49, are preferably arranged in pairs in fixed position on the rock-shaft or arm 36, so that there may be said to be a gang of markers thereon. In order to guide the markers over the sheet imposing surface, and to support the rock-shaft or arm 36 in a position so as to move parallel with said surface, the outer end of said rock-shaft is provided with a comparatively large guide-wheel 50, which travels in contact with said surface. For the purpose of pressing down the sheet imposed upon the imposing surface, in advance of the markers, said rock-shaft or arm is provided with lateral arms 51 which support a rotary shaft 52 provided with truck wheels 53, which travel over the sheet to be marked.

Figure 4:
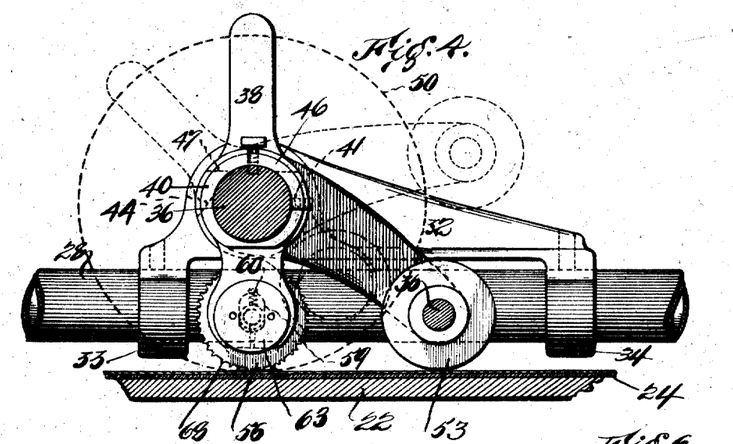
Fig. 4 is an enlarged side elevation partly in section, showing a guide-rail or bar, a carriage and a marking device, with a portion of the sheet imposing plate.

In Figs. 4, 10, 11 and 12, the preferred construction of each marker device is illustrated. A collar 54 is provided at one end of a shank or plate 55, which carries a marker wheel 56, and said wheel is located between the plate 55 and a disk 57 which is provided with a tubular journal 58 which is guided in a slot 59 in said plate and upon which the marker wheel 56 may rotate. One end of a spring 60 is seated on the journal 58 and the other end in one end of slot 59, said spring serving to hold the marker wheel in the extreme position shown in section in Fig. 12. Diametrically opposite the spring 60 the hollow journal 58 is provided with a pin 61, in the form of a screw for the sake of ready application and removal, which pin is guided in a hole 62 in the end of the plate 55. Said marker wheel is therefore yieldingly supported and is guided outwardly by means of the slot 59 and journal 58, supplemented by the action of the spring 60 and the guide pin 61. To assemble said parts and hold them together, there is provided on the opposite side of the plate 55 a button or disk 63 which is provided with a screw stud 64 which screws into the journal 58. Said button 63 may be provided with a couple of holes as indicated in Fig. 4 for receiving a hand tool for unscrewing the same from its connection with the journal 58. A tongue 65, in the form of a set screw, is provided for guiding each marker upon its rock-shaft or arm 36, to which end the latter is provided with a longitudinal groove 66 into which said tongue or set screw protrudes so that the marker may not turn on the rock-shaft. Said set screw furthermore provides means for fixing the marker in adjusted position upon its rock-shaft or carrying arm or for adjustably holding it in the position to which it may be moved. Said rock-shaft or arm is furthermore graduated on its outer surface in accordance with a desirable unit of measurement so that the markers may be adjusted to fractions of inches, for instance, along the rock-shaft.

Figures 11, 11A, 12:
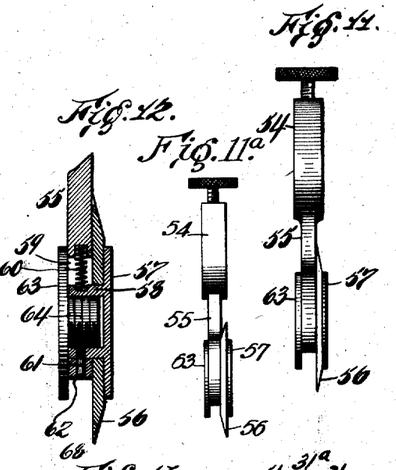
Fig. 11 is an edge view thereof.
Fig. 12 is an enlarged section on the line 12—12, Fig. 10, in the direction of the arrow.

A marker device such as described will enable the marker 56 to be positioned upon either side of the shank 55. This may be done by removing the screw 61 and the disk 63, then taking off the marker wheel and disk 57 from that side on which they are located and inserting the journal 58 into the slot 59, from the opposite side of shank 55, and replacing the said disk 63 and screw 61. Inasmuch as the opposite flat surfaces of collar 54 are parallel with each other and the shank is extended from said collar in a plane which is transverse of the axis of the opening through said collar or the direction in which said opening extends therethrough, said shank will lie in a plane parallel with said flat surfaces. Furthermore the planes of said flat surfaces of collar 54 lie equidistant from the plane of shank 55 inasmuch as the said shank is offset equidistantly from said surfaces, so that said parts are arranged symmetrically. Now if the retaining members which hold the marker wheel at the location shown in Figs. 11 and 12, are released from the said wheel so as to release the said wheel, and the said wheel be turned face for face and replaced at the same location and said retaining members be replaced, the marking edge of said wheel will be positioned in approximately the plane of that flat surface of said collar corresponding with the side of the marking device on which said wheel is so retained and located, and will be considerably offset from the other flat surface at the opposite side of said collar. Such being the case, and especially if the marking edge then lies exactly in the plane of the corresponding flat surface of said collar, the setting of the collar 54 on the graduated arm so that said flat surface will coincide with a certain graduation will set the marking edge to correspond with that graduation. Said flat surfaces of said collars therefore constitute the indexes of the marking device. In order to prevent drawing or puckering of the paper on which the marker acts, each marker wheel is preferably provided with teeth such as 68, which are arranged in spaced groups in one plane transverse of the wheel-axis and around the periphery of the wheel. In the present instance, each group consists of three teeth, separated slightly as compared with the spaces between groups.

Preferably the edge portion of the marker wheel is beveled so as to locate the teeth thereof in the plane of one of the side surfaces of said wheel and to offset them from the opposite surface of said wheel. Inasmuch as by the described construction of marking device the marker wheel may be held in reversed position by simply removing the retaining members 63 reversing the said wheel and replacing said members, it is possible to produce a line coincident with the plane of one of the flat index surfaces of collar 54 or one which is slightly offset from said surface to an extent corresponding with the thickness of said marker-wheel. The various adjustments of the marker-wheel rendered possible by the described construction of marking device will obviously possess a number of advantages.

Figs. 11 and 11ª show the marking wheel 56 in two positions of the positions above described. In Fig. 11, the wider side surface of the marker wheel 56 is shown as flat against the adjacent surface of the shank 55, in which case the marking edge will be offset from that surface of the collar 54 which is located at the corresponding side of the marking device. In Fig. 11ª, the marker wheel is shown as so positioned that the marking edge will be in the plane of the adjacent side surface of the collar 54.

The parts which are guided by the bar 28 have been described, but those guided by the bar 27 have not. A detailed description of the other parts, is however, not necessary as their construction is in all respects substantially the same as that of the corresponding parts described. In brief, a carriage 69 is guided upon the guide-rail 27 so as to move at right angles to the carriage 32, while a rock-shaft or arm 70 extends from the carriage at right angles to the other rock-shaft or arm 37. Said rock-shaft 70 is furthermore provided with a handle 71, and at its outer end with a large guide-wheel 72, while truck wheels 73 and markers 74 are carried by the rock-shaft 70. The details of these parts are practically the same as those of the corresponding parts before described.

Figure 13:
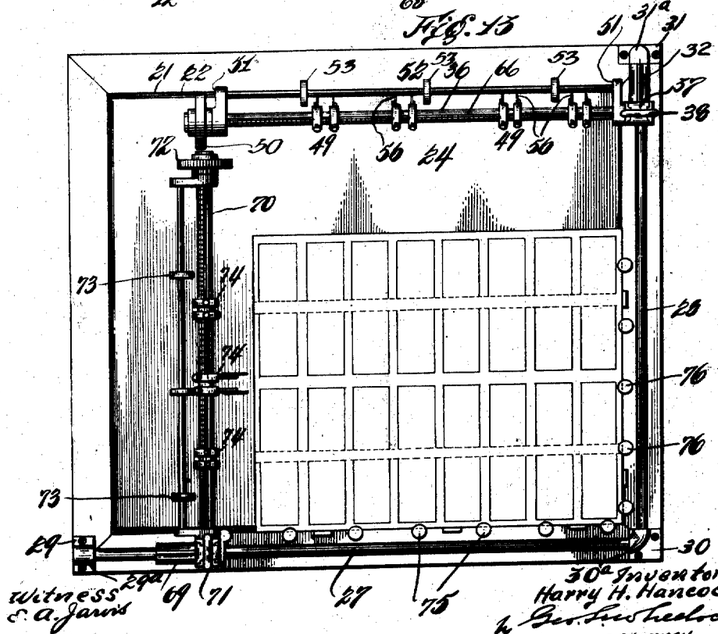
Fig. 13 is a top plan view of the complete apparatus, showing a printed sheet after lining up.

It will be seen by referring to Fig. 13, that the limits of movement of the carriage 32 are as great as one dimension of the large sheet of paper to be lined, while the limits of movement of the carriage 69 are as great as the other dimension of said sheet, in consequence of which each arm or rock-shaft may be moved across the sheet to be lined for a distance corresponding with the corresponding dimension of such sheet. It will be seen that the planes of movement of the rock-shafts 36, 70 and consequently the markers thereon, are parallel with the surface to be lined, and that the markers, if in using position, will be moved across and directly in contact with the surface to be lined.

Figures 2, 3:
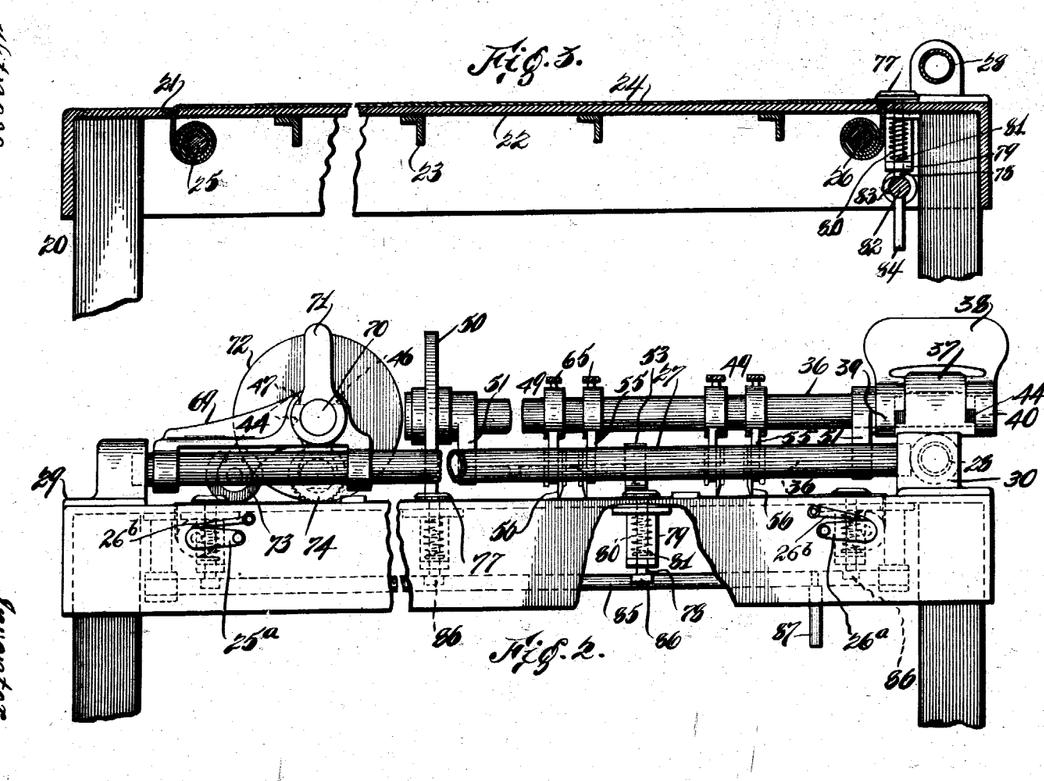
Fig. 2 is a side elevation, showing the apparatus of Fig. 1 as viewed in the direction of the arrow.
Fig. 3 is a transverse section on the line 3—3, Fig. 1, in the direction of the arrow.

At one side of the frame or table along a line parallel with that edge of the sheet imposing surface which is adjacent the guide-rod 27, there is arranged a series of clamps 75, for the purpose of gripping the corresponding edge of the sheet to be lined up, and a similar series of clamps 76 is located along a line parallel with that edge of the sheet imposing surface adjacent the guide-rail 28. Preferably the series 75 is used alternately with the series 76. In such case the clamps 75 would hold one edge of the paper, in the direction of the strain imposed thereon by the series of markers 49 traveling across said sheet, while the series of clamps 76 would then be used to withstand the strain in the direction imposed on the paper by the markers 74 traveling across the sheet. As each clamp is preferably of the same construction, a description of one will apply to all. Referring to Figs. 2 and 3, each clamp is provided with a button or head 77 and a stem 78, which is guided in the frame or table at a point just outside of the line separating the sheet imposing plate 22 from the said frame, so that the inner edge of said button projects slightly over the sheet imposing plate, and may grip the paper when the clamp is lowered. Stem 78 is guided in a hanger 79 arranged underneath the top of the frame or table, and the head of the clamp is lowered by the action of a spring 80 coiled about the stem 78 and connected at 81 with said stem. Each of the clamps being constructed and arranged as described, the series of clamps 76 may be raised simultaneously by means of a rock-shaft 82 journaled in the frame or table and provided with lifting cams 83, which are adapted to be turned through the medium of a handle 84 so as to force said cams against the lower ends of the stems of said clamps. The clamps are lowered automatically and independently so as to grip the paper individually, through the action of the springs 81, when the rock-shaft 82 is turned in a reverse direction. A similar shaft 85, cams 86 and operating handle 87 are used for positively raising the other series of similarly lowered clamps 75.

Figures 5, 6, 7, 8, 9, 14, 15:
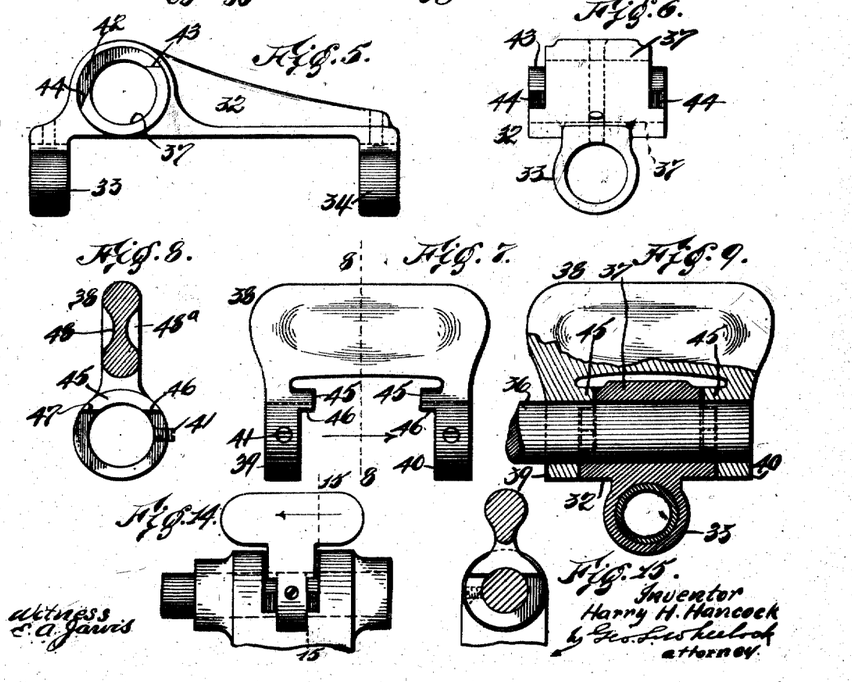
Fig. 5 is a side elevation of a carriage.
Fig. 6 is an end elevation thereof.
Fig. 7 is a side elevation of an operating handle for the markers.
Fig. 8 is a transverse section thereof in the direction of the arrow on line 8—8.
Fig. 9 is a section partly in elevation, showing an operating handle assembled with a carriage, together with a portion of a rock-shaft operable by said handle.
Figs. 14 and 15 are, respectively, a side view and a section on line 15—15, Fig. 14, showing a modification.
Figure 10:
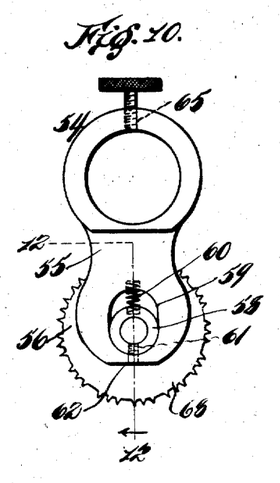
Fig. 10 is a side elevation of a marker.

In Figs. 14 and 15 a modification of the handle construction for oscillating the marker arms is illustrated. The stops and abutments are substantially the same as before described, and instead of the handle being bifurcated or U-shape, the carriage is correspondingly shaped to receive the handle within it.

Figure 1:
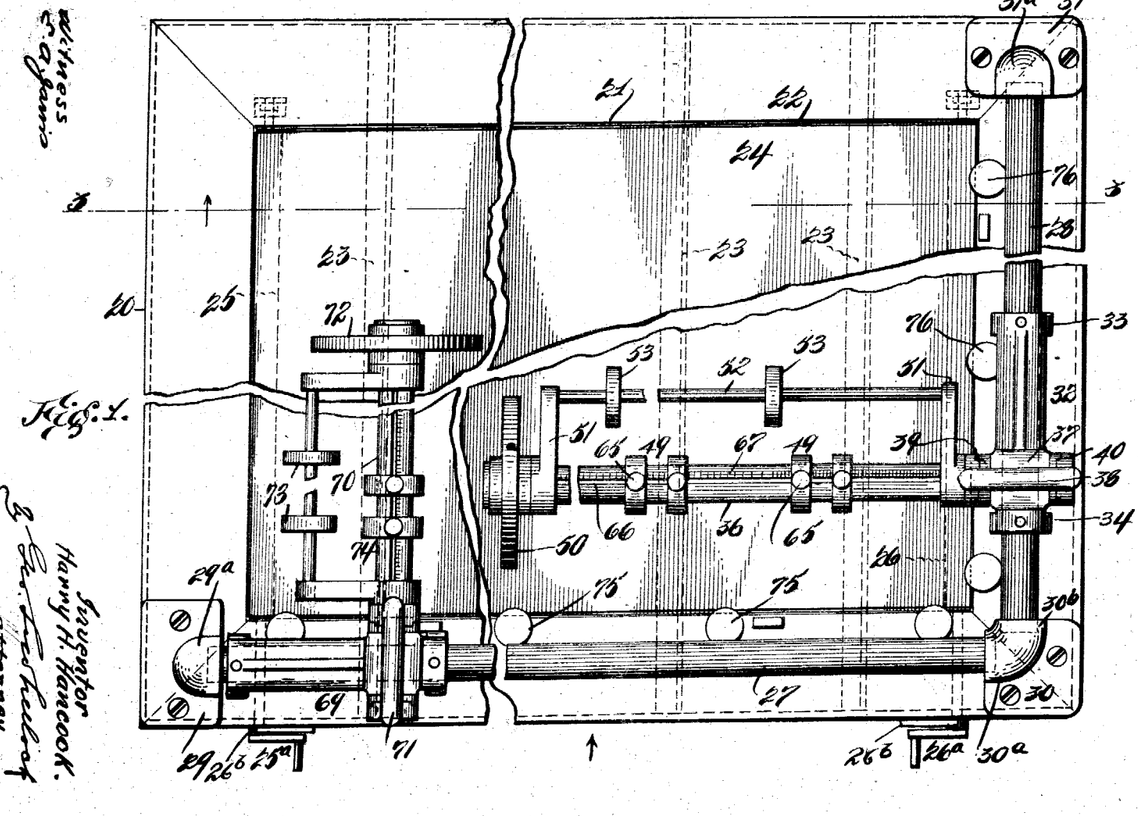
Figure 1 is a top plan view, broken crosswise in two directions in order to show the parts enlarged.

The apparatus is used as follows: It is first determined just what kind of line-up is desired, this depending upon the number of pages and the size of the page. The markers are then adjusted to desired position, in pairs, according to the graduations on the marker supporting arms or the type measurement. The object of this is to enable the operator to set the markers and lay out a sheet before the form is printed on the sheet, without the use of other tools. In Fig. 1, all of the markers are shown in position for use, while in Fig. 13 some of the markers are shown in using position and others are shown as set back out of using position, which is accomplished by loosening the set screws 65 so as to disengage the same from the corresponding groove, then giving the markers a partial turn about the carrying arms or shafts, and then fixing the markers in their angularly adjusted position by binding the screws 65 against the marker shafts. Either before or after the markers are adjusted, the sheet to be lined up is placed upon the previously tightened apron-sheet 24, and one edge of the sheet of paper is gripped by lowering the clamps 75, for instance. When said edge is gripped, the gangs of markers 49 may be caused to travel over the sheet of paper and to rule lines thereon in accordance with the nature of the markers. If the markers comprise toothed marking wheels as before described, the teeth will form parallel lines of indentations in the paper, the yielding surface 24 enabling the teeth to properly indent the paper, and the said markers being yielding, they will receive an undulating action if the sheet being lined is not perfectly level. Consequently, the sheet will be perfectly lined no matter whether it is perfectly level or not. As the toothed marker-wheels penetrate the soft surface covering, the teeth engage with the plate 22, thus causing the wheels to rotate. In causing the gang of markers 49 to travel across the sheet of paper, the operator grasps the handle 38 and forces the markers 49, and the parts carrying them, in the direction in which said parts are shown in full lines in Fig. 4. By the very act of grasping the handle 38 and pushing the parts in the desired direction, the markers are thrown at will to using position, and the movement in that direction is limited by the stops 46 coming in contact with the abutments 43 on the carriage. This act also brings the truck wheels in advance of the markers down upon the paper, thereby smoothing out the paper in advance of the action of the markers. When the markers 49 are moved as far as required, the operator rocks the parts operated by the handle at will by moving the handle from the full line position shown in Fig. 4 to the position shown in dotted lines. This raises the truck wheels from the paper together with the markers. The parts may then be returned, when necessary, by pushing the carriage 32 in reverse direction, the parts being maintained in the dotted line position shown in Fig. 4 by the action of the operator pressing against the handle 38. It is of course obvious that when the markers 49 are being used, the carriage 69 and its concomitant parts are moved to one side out of the path of the markers 49 and concomitant parts. When the markers 49 have been caused to do their share of the lining up, they are left in their removed position such as shown in Fig. 13, and the operator then takes hold of the handle 71 connected with the carriage 69 and moves said carriage with the markers 74 in a direction at right angles to the line up produced by the markers 49, the clamps 75 having first been released from the paper, and the clamps 76 engaged with the corresponding edge thereof. The marking always starts from the position of the clamps so as to properly act upon the paper. The markers 74 and the concomitant parts are operated similarly to the markers 49 and their concomitant parts, and when the markers 74 have done their share of the lining up, they may be moved away from the paper by rocking the shaft or arm 70 on its axis, in the manner before described. The sheet of paper will now be perfectly lined up as desired, and if any portions of the printing form be out of registry, this can be promptly ascertained inasmuch as the markers may be adjusted to be movable across each other at an infinite number of points. After the printing form is on the press, it can be quickly ascertained whether or not there is proper registry by taking a printed sheet and lining it up on the apparatus. The apparatus such as described, has many advantages which will be apparent to those skilled in the art of printing. Of course the apparatus may be made use of for other purposes. All parts which can be so made are preferably of metal.

It is obvious that the invention is susceptible of modification, as parts may be omitted, parts added and parts substituted without departing from the scope and spirit of the invention as expressed in the claims.

What I claim as new is:—

1. In a lining apparatus, the combination of a sheet-imposing plate, a support, a marker adapted to be moved upon said support across said plate in one direction, a second support, and another marker movable upon said second support across said plate in a direction at right angles to the direction of movement of aforesaid marker, each marker being movable at will laterally of its said direction of movement and of said support, through a wide and greatly variable range of adjustment, and means for adjustingly holding each marker in the position to which it is laterally moved.

2. In a lining apparatus, the combination of a sheet-imposing plate, a support, a gang of markers movable upon said support across said plate in one direction, a second support, and another gang of markers movable upon said second support across said plate in a direction at right angles to the direction of movement of aforesaid gang, and means incorporated with each gang for variably securing the individual markers thereof, at will, relatively to any given position of its markers and relatively to the entire field traversed by the other gang.

3. In a lining apparatus, the combination of supporting means, a marker supported thereon for movement in one direction, another marker movable in a direction at right angles to the direction of movement of aforesaid marker, each of said markers being movable laterally of its said direction of movement over the greater portion of the field over which said marker may be movable, and means for adjustably holding each marker in the position to which it is laterally moved.

4. In a lining apparatus, the combination of supporting means, a gang of markers supported thereon for movement in one direction, additional supporting means, another gang of markers supported on said additional means and movable in a direction at right angles to the direction of movement of aforesaid gang, and means associated with the individual markers for independently and adjustably holding any one of said markers upon its said supporting means and at various points lateral of said marker, whereby either one of any given two of said angularly disposed markers may be adjusted to cross the path of the other at an infinite number of points of intersection.

5. In a lining apparatus, the combination of a sheet-imposing plate, a support substantially parallel with said plate, a gang of markers on said support adapted to be moved across said plate in one direction, a second support at right angles to the first support, and another gang of markers located on said second support and movable in a direction at right angles to the direction of movement of aforesaid gang, each of said markers being laterally stiff but yieldably mounted to move perpendicularly to the sheet-receiving surface of said plate.

6. In a lining apparatus, a support, and a gang of alined toothed marker wheels thereon, and independently adjustable means for each wheel for holding said wheels laterally of each other on said support, but at variable distances from each other.

7. In a lining apparatus, a support, and a yieldably mounted marker thereon movable toward said support, means located laterally of said marker for guiding it in its movement and means also located laterally of said marker for automatically moving said marker perpendicularly toward and pressing it in contact with a surface to be lined.

8. In a lining apparatus, the combination of a sheet-imposing plate, supports substantially parallel with the surface of said plate, two arms arranged on said supports at right angles to each other, each being movable away from said plate and guided, on its corresponding support, transversely of itself across said plate but in a plane substantially parallel therewith and in the plane of movement of the other arm, the range of movement of each arm being greater than the length of the other arm, and a series of markers on each arm, each of said markers being swingable on an arc about said arm, whereby any desired number of said markers may be moved out of marking position.

9. In a lining apparatus, the combination of a plate for supporting a sheet to be marked, a support, and a marker having a pivot mounted on said support, the axis of said pivot being over and parallel with said plate when said marker is in marking position and said marker being located to one side of said axis, said marker extending away from said axis at substantially right angles to the surface to be marked, and cushioning means between said marker and said pivot and independent of said pivot.

10. In a lining apparatus, the combination of a sheet-imposing plate, a support, an arm pivotally supported at one end thereon to adapt it to be swung to move it to or from said plate, said arm being guided transversely on said support across said plate, and a marker movable by said arm in a line parallel with its said pivot and said guiding support and adapted to be moved for a considerable distance longitudinally of said arm and with respect to said guiding support, said marker being provided with means applied to said arm for adjustably holding it when moved laterally of said line of movement to any point with respect to said support.

11. In a lining apparatus, the combination of a sheet-imposing plate, a support having a position substantially parallel with the surface of said plate, an arm guided transversely on said support across said plate, a guide roller journaled upon the outer end of said arm, adapted to travel upon said plate, said arm being oscillatable on its axis, a marker on said arm, and means extending laterally of said arm for so oscillating it.

12. In a lining apparatus, the combination of a sheet imposing plate, a support having a position substantially parallel with the surface of said plate, a swingable arm guided transversely on said support across said plate, a marker on said arm, a second support arranged at right angles to aforesaid support, another swingable arm guided transversely on said second support in a direction at right angles to the direction of movement of aforesaid arm, and a marker on said other arm, both of said arms being pivotally mounted at their inner ends on their said supports.

13. In a lining apparatus, the combination of a plate with a sheet-imposing surface, a plurality of markers, means for carrying said markers and for moving them substantially parallel with said surface and in straight lines, and presser means positioned in advance of said markers and operating on substantially the entire width of a sheet, to press on said sheet as said markers travel over its surface.

14. In a lining apparatus, the combination of a plate with a sheet-imposing surface, means for securing one edge of a sheet and holding it on said surface, a marker, means for carrying and moving said marker substantially parallel with said surface and at right angles to and away from said securing means and edge, and presser means substantially parallel with said securing means and edge, and positioned in advance of said marker for pressing on said sheet as said marker travels over its surface.

15. In a lining apparatus, the combination of a sheet-imposing plate, supports substantially parallel with the surface of said plate, two arms arranged on said supports at right angles to each other, each being movable away from said plate and guided on its corresponding support, transversely of itself across said plate but in a plane substantially parallel therewith, and in the plane of movement of the other arm, the range of movement of each arm being greater than the length of the other arm, and a marker on each arm.

16. In a lining apparatus, the combination of a sheet-imposing plate, supports substantially parallel with the surface of said plate, two arms arranged on said supports at right angles to each other, each being guided, on its corresponding support, transversely of itself across said plate but in a plane substantially parallel therewith, and each arm being movable toward or from the plane of said plate, and a gang of markers on each arm, said gangs being so located on said arms as to produce intersecting lines upon a sheet imposed on said plate when said arms are successively moved in said parallel plane, each arm having a range of movement as great at least as the field adapted to be traversed by the gang of markers on the other arm, and each gang of markers being adjustable within a wide range and for a distance closely approximating that of the range of movement of the other gang.

17. In a lining apparatus, the combination of a suitably supported guidebar, an arm pivotally supported on said bar and free at one end, and provided with means for moving it freely transversely of itself on said bar, a guide roller journaled upon the said free outer end of said arm, and a marker on said arm, said arm being oscillatable on its longitudinal axis.

18. In a lining apparatus, the combination of a suitably supported guide bar, a carriage adapted to travel along said bar, an arm swiveled at one end on said carriage at right angles to the path of movement of said carriage and free at the other end, a guide roller journaled upon the said free outer end of said arm, and a marker on said arm.

19. In a lining apparatus, the combination of two suitably supported guide bars, arranged at right angles to each other, two arms supported by and extending at right angles to said bars respectively, a marker on each arm and movable longitudinally thereof, means for adjustably securing each marker at various points along its arm, and means for moving each of said arms away from the plane of action of said markers.

20. In a lining apparatus, the combination of two suitably supported guide bars, arranged at right angles to each other, carriages, one on each guide bar, two arms supported by and extending at right angles to said carriages respectively, the arm of each said carriages having a length less than the range of travel of the other carriage, a marker on each arm adapted to be positioned at a plurality of points along said arm, and means for moving each of said arms away from the plane of action of said markers.

21. In a lining apparatus, the combination of a suitably supported guide bar, a carriage thereon, an arm swiveled to said carriage at one end of its longitudinal axis so that it may be turned on said axis, and extending away from said guide bar at right angles to said guide bar, a marker on said arm, means for turning said arm on its said axis, and a stop between said carriage and arm for limiting the turning movement of said arm.

22. In a lining apparatus, the combination of a suitably supported guide bar, a carriage thereon, an arm swiveled to said carriage at one end of its longitudinal axis so that it may be turned on said axis, and extending away from said guide bar at right angles to said guide bar, a marker on said arm, means for turning said arm on its said axis, and spaced stops between said carriage and arm for limiting the turning movement of said arm in two directions.

23. In a lining apparatus, the combination of a guide, an arm supported on and guided longitudinally of said guide, said arm being oscillatable on its own longitudinal axis, a marker on said arm, means for turning said arm on its said axis, and a pressure device positioned on said arm relatively to said marker for pressing on a sheet as said marker travels over its surface.

24. In a lining apparatus, the combination of a guide, an arm supported and guided thereby, said arm being oscillatable on its own axis, a marker on said arm, means for turning said arm on its said axis, a bracket on said arm, and means carried by said bracket and positioned relatively to said marker for pressing on a sheet as said marker travels over its surface.

25. In a lining apparatus, the combination of means for holding stationary a sheet to be lined, a guide, an arm supported and guided thereby, said arm being oscillatable on its own axis, a marker on said arm, means for turning said arm on its said axis, a bracket on said arm, and rollers carried by said bracket and positioned relatively to said marker for traveling over and pressing on said sheet as said marker travels over its surface.

26. A toothed marker wheel, having a series of pointed teeth arranged in spaced groups in one plane transverse of the axis of said wheel, said spacing being greater than the spaces of each group, whereby puckering or drawing of the paper is precluded.

27. A toothed marker wheel, having a single series of pointed teeth extending around the circumference of the wheel and differentially spaced apart, whereby puckering or drawing of the paper is precluded.

28. In a lining apparatus, in combination with a sheet-imposing plate, a support, a spring, a marker, guided by one of its side faces on said support in a line perpendicular to said plate, said spring being arranged to one side of said marker and said marker being cushioned by said spring in the direction of said movement and maintained in marking position by said spring, and means for drawing said marker along a sheet on said plate in a direction at right angles to said line.

29. In combination, a wheel support, a spring, and a toothed marker wheel on said support, said wheel being cushioned by said spring and maintained in marking position thereby.

30. In combination, a wheel support having a slot, a marker wheel having a journal located in said slot, and cushioning means between said journal and support for maintaining said wheel in marking position.

31. In a lining apparatus, the combination of a plate having a soft sheet-imposing surfacing for yieldingly supporting a sheet to be marked, parallel rolls supported adjacent said soft surfacing and located at opposite edges of said plate, means associated with said rolls for placing said surfacing under tension across said plate, and a marker adapted to be moved across said surfacing.

32. In a lining apparatus, the combination of a plate having a soft flexible surface-covering upon which a sheet to be marked can be placed, and a yieldably mounted marker wheel adapted to be moved across said covering, and having a series of teeth to penetrate said sheet and soft covering and bear on said plate.

33. In a lining apparatus, the combination of an arm having a graduated outer surface, a marker, and means for affixing said marker to one side of said arm, and located directly upon the said graduated surface for permitting the adjustment of said marker in accordance with the graduations, two corresponding lateral surfaces of said marker-affixing means and said marker being approximately in one plane.

34. In a lining apparatus, the combination of a sheet imposing plate, a support, a graduated arm on said support, a gang of markers, and separate members for supporting said markers on the graduated outer surface of said arm for adjustment in accordance with the graduations, each marker of said gang being mounted movably about the axis of said arm so that it may be turned on said arm to or from said plate.

35. In a lining apparatus, the combination of a sheet imposing plate, a support substantially parallel with the surface of said plate, a graduated arm extending at right angles to and guided on said support, and a marker on said arm for adjustment along it at will in accordance with the graduations, with an additional support arranged at right angles to the first said support, a second graduated arm guided on said additional support at right angles to said first mentioned graduated arm, and another marker similarly adjustable on said second arm, each of said markers being movable through a wide range of adjustment with respect to its corresponding support.

36. In a lining apparatus, the combination of a sheet-imposing plate provided with a soft surface-covering for receiving a sheet of paper, guide bars parallel with said plate, arranged at right angles to each other, graduated arms supported one on each bar in right angular relation one to the other, each of said arms being swingable on an arc around the axis of its supporting bar, and two gangs of spring-pressed toothed marker-wheels arranged one gang on each arm, and means for adjustably holding each marker-wheel independently when moved along its arm to a point opposite any desired graduation, and adapted to line the adjacent surface of the sheet of paper imposed on said covering.

37. In an apparatus of the class described, the combination of a supporting frame, a soft surfaced plate adapted to receive a removable sheet on said soft surface, toothed means for indenting said sheet in parallel lines by the traveling engagement of said indenting means with said plate, additional toothed means for indenting said sheet in parallel lines running at right angles to aforesaid lines, also by the traveling engagement of said additional means with said plate, and means associated with each of said indenting means for moving the latter toward and away from said plate, whereby each of said indenting means may be positioned so as not to interfere with the indenting action of the other, all of said parts being suitably supported on said frame.

38. In combination, a collar forming an index member, a shank extending therefrom in a plane transversely of the direction of the opening through said collar, a rotary marker, and means for mounting said marker on said shank, said marker being positionable upon said shank by said mounting means, to either side of the said shank, in a plane of rotation parallel with aforesaid plane.

39. In combination, a marker shank having an index member provided with parallel surfaces, a marker, and means for positioning said marker on either side of said shank so as to place its marking edge approximately in the plane of either of said surfaces and also out of the plane of either of said surfaces.

40. In combination, a marker shank having an index member provided with parallel surfaces, a rotary marker-wheel, and means for positioning said marker on either side of said shank so as to place its marking edge approximately in the plane of either of said surfaces and also out of the plane of either of said surfaces.

41. In combination, a marker shank having an index member provided with parallel surfaces, a removable marker, and means for positioning said marker on either side of said shank so as to place its marking edge approximately in the plane of one of said surfaces and, after removal, approximately in the plane of the other of said surfaces.

42. In combination, a marker shank having a visible index surface, a marker-wheel, said surface being located radially of said wheel, and the plane of action of the marking edge of which marker is in the plane of one of the side surfaces of said wheel and offset from the plane of the other side surface, and means for mounting said wheel reversibly on said shank, so as to position said marker with the plane of action of its edge either in or out of the plane of said index surface.

43. In combination, a marker shank having an index member provided with parallel surfaces; a marker, and means for positioning said marker on either side of said shank so as to place its marking edge approximately in the plane of either of said surfaces and also out of line with either of said surfaces, the plane of action of said marking edge being in the plane of one of the side surfaces of said wheel, and said wheel being reversible on said positioning means.

44. A marking device, comprising a support, a marker and reversible means mounted rigidly on said support for carrying said marker to line in either of two positions, said reversible means having a retaining portion between which and said support said marker is located when in position for use, and said marker being itself reversible on and independently of said reversible means to line in either of two other positions.

45. In combination, a marker wheel, a wheel support, a hub-like member for said wheel, said support having a recess for the play of said member therein, and means at said recess for cushioning said member and wheel on said support, said recess and cushioning means being located laterally of the said wheel.

46. In combination, a marker wheel, a wheel support, a hub-like member for said wheel, said support having a recess for the play of said member therein, means in said recess for cushioning said member and wheel on said support, said recess and cushioning means being located laterally of the said wheel and said wheel extending beyond and covering them at one side of said support, and means for covering said recess and cushioning means at the other side of said support.

47. In combination, a marker wheel, a wheel support, a hub-like member for said wheel, and constituting a bearing therefor, said support having a recess for the play of said member therein, means for fixing said member against turning on said wheel support, and means at said recess for cushioning said member and wheel on said support.

HARRY H. HANCOCK.

Witnesses:
WILLIAM I. MARSTERS,
WALTER C. MERRITT.